June 18, 1963  T. S. BRISKIN ET AL  3,094,038
DUAL PURPOSE SHUTTER ARRANGEMENT FOR A SLIDE PROJECTOR
Original Filed March 21, 1955  2 Sheets-Sheet 2
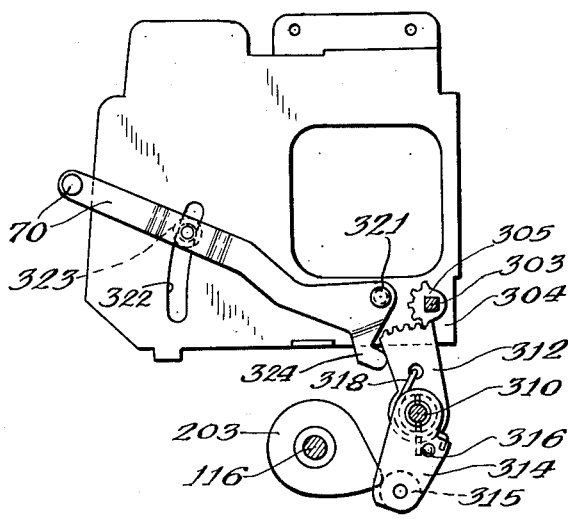
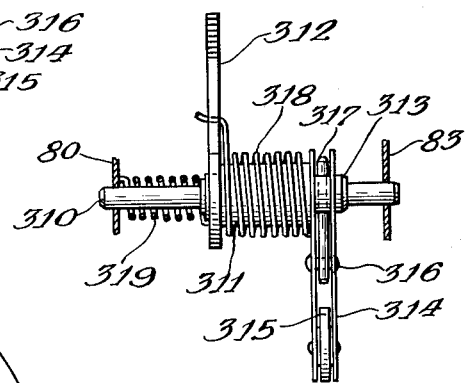
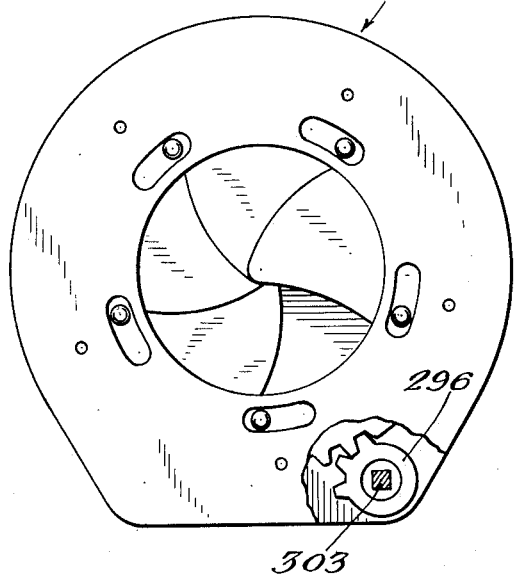
Inventors:
Theodore S. Briskin
Robert L. Moore
Rudolph A. Rom
By: Zabel, Baker, York, Jones & Dithmar
Attorneys United States Patent Office 3,094,038
Patented June 18, 1963

3,094,038
DUAL PURPOSE SHUTTER ARRANGEMENT
FOR A SLIDE PROJECTOR
Theodore S. Briskin, Chicago, Robert L. Moore, La Grange Highlands, and Rudolph A. Rom, Stickney, Ill., assignors, by mesne assignments, to Revere Camera Company, a corporation of Delaware
Original application Mar. 21, 1955, Ser. No. 495,474, now Patent No. 2,968,993, dated Jan. 24, 1961. Divided and this application May 13, 1960, Ser. No. 29,058
2 Claims. (Cl. 88—28)

This invention relates to a dual purpose shutter arrangement for a slide projector, and is a division of our copending application, Serial No. 495,474 filed March 21, 1955, now Patent No. 2,968,993, granted January 24, 1961.

It is customary in slide projectors to provide a shutter to cut off the light beam during the slide changing operation. The shutter operation is controlled by the mechanism of the slide projector, and is generally in the form of a wipe blade located substantially in the plane of the slide which is being projected.

It is an object of the present invention to provide a slide projector in which the shutter is located in the projecting lens assembly so that it can also be used to regulate the light intensity. For instance, the usual home slide projector is equipped with a lamp of sufficient wattage to project an image on a screen located at a distance of from 15 to 30 feet. However, sometimes it is desired to provide a small screen when slides are shown to only two or three people under conditions where a full sized screen is not available, as for instance when the slide projector is used for a visual aid for a salesman. In such situations, the light intensity would have to be cut down very substantially in order to obtain proper color values in the projected image.

To accomplish this, it is necessary that a shutter or lens stop be located in the projecting lens.

It is another object of our invention to provide an improved arrangement by means of which the shutter actuating mechanism can be located in one part of the slide projector, and the shutter itself can be slidably mounted in another part of the slide projector, in combination with means for providing a connection between the two which is operative irrespective of a change in the relative positions of the two.

Still another object is to provide for a slide projector, an improved shutter for cutting off the light beam which provides a fade rather than a wipe.

A still further object is to provide dual control means for a shutter of the type described, one control means serving to actuate the shutter for beam cut-off purposes, and the other serving to actuate the shutter to control intensity.

Other objects, features and advantages will become apparent as the description proceeds.

With reference now to the drawings in which like reference numerals designate like parts:

FIG. 2 is an elevation of the shutter actuating and control mechanism, being taken substantially along line 2—2 of FIG. 1, certain structural elements being omitted for the sake of clarity;

FIG. 3 is an enlarged elevation of the rock shaft assembly taken substantially along line 3—3 of FIG. 2; and FIG. 4 is an elevation of the shutter assembly taken substantially along line 4—4 of FIG. 1.

Figure 1:
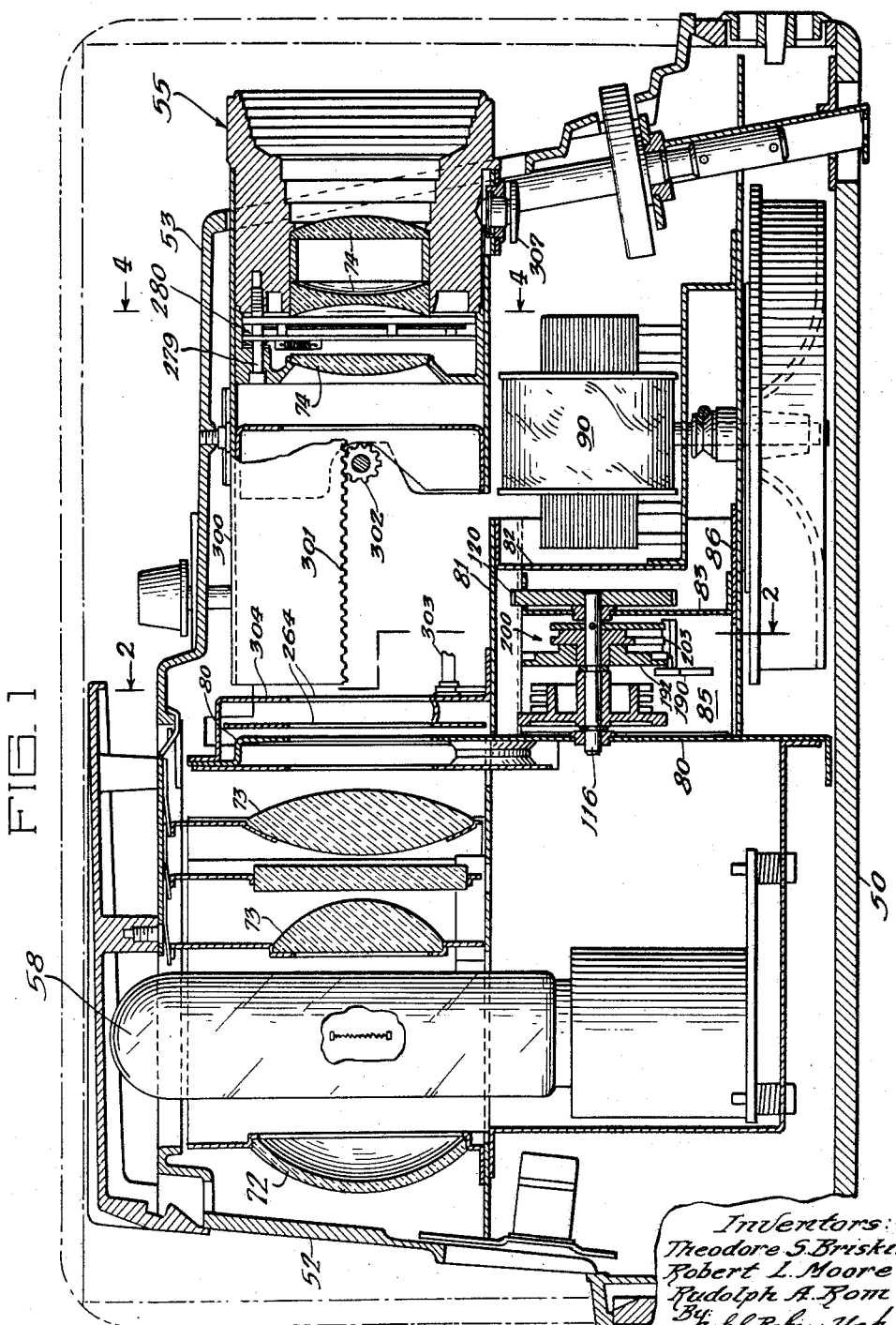
FIG. 1 is a longitudinal vertical section through a slide projector embodying our invention.

FIG. 1 shows a slide projector which includes housing parts 50, 52 and 53. A lens unit 55 is telescopically received within the front housing part 53. The optical system comprises a mirror 72, a lamp 58, condenser lenses 73 and projection lenses 74, the latter being mounted in the lens unit 55.

The slide projector includes a motor 90 and an intermittently rotating drive shaft 116, which carries a cam assembly 200. Means are provided for operating the projector in successive cycles of operation, said means including a cycling cam 192 and a cooperating follower 190. The cycling cam 192 forms a part of the cam assembly 200, as does a shutter operating cam 203, also shown in FIG. 2.

As shown in FIG. 1, a shutter assembly 280, also shown in FIG. 4, is located within and forms a part of the lens unit 55, the shutter assembly being located between two of the elements of the projecting lens 74, and being secured therein by suitable screws 279. The shutter assembly includes an actuating sleeve 296 having an opening of non-circular cross section through which extends a shaft 303 of similar cross section, the parts being shown as of square cross section, in order to provide a splined connection between the two.

The lens unit 55 is mounted in a generally tubular member or shell 300, as shown in FIG. 1 and is removably secured therein by a removable set screw, 307. An edge portion of the shell 300 is provided with rack teeth 301, which mesh with a pinion 302 which is connected to the focusing knob 64. Thus, adjustment of the focusing knob shifts the shell 300 and the lens unit 55 back and forth.

To accommodate this focusing motion, a sliding connection is provided between the actuating sleeve 296 of the shutter assembly, and the operating mechanism of the projector so that the shutter will be operated during each cycle of operation. This sliding connection includes the square shaft 303 which is rotatably mounted in a plate 304 and projects forwardly therefrom as shown in FIG. 1. The plate 304 is located in front of the vertical plate 80. Secured to the square shaft 303 and rotating therewith is a partial pinion 305, as shown in FIG. 2, by means of which the square shaft 303 may be rotated to open and close the shutter.

The operating mechanism of the projector includes shutter actuating means which is located in the mechanism assembly adjacent the cam 203. Thus, the shutter is normally operated by the cycling means heretofore described, to cut off the light beam during the slide changing operation, that is, during each operating cycle. By using an iris type shutter 280 located in the projecting lenses, as contrasted with the usual wipe blade located in the film plane, two important advantages are obtained; first, the light beam is cut off by a fade rather than a wipe, and secondly, the shutter can be used to regulate the intensity of the light beam, that is, the light intensity of the projected picture.

To accomplish this latter result, regulation of light intensity, manually actuated means, including a shutter control lever 70, are provided for partially closing the shutter 280 even when in its "open" position. In other words, the manually actuated means are so related to the automatically actuated means that the size of the aperture formed by the shutter plates 284 can be controlled without interfering with the automatic shutter operation.

The shutter actuating means includes a rock shaft 310 journaled in structural plate members 80 and 83, as shown in FIGS. 2 and 3. The rock shaft includes an enlarged hub portion 311 and a reduced hub portion 313. A sector 312 is suitably staked to the rear end surface of the hub portion 311. A double arm follower 314 is rotatably mounted on the reduced hub portion 313. A nylon follower disk 315 is mounted between the two arms of follower 314 and is engaged by the shutter cam 203, as illustrated in FIG. 2. A pin 317 extends through the reduced hub portion 313 at a point between the two arms of the follower 314 and is adapted to engage the rivet 316. Thus the pin and rivet arrangement permits clockwise movement of the sector 312 with respect to the follower as viewed in FIG. 2, but it limits or defines the angular position of the two in the opposite direction. A relatively strong spring 318 engages the parts 312 and 314 to urge them into their limiting relative position. The arrangement is such that when the follower 314 is actuated by the shutter cam 203, the whole assembly will be rocked in the counterclockwise direction as viewed in FIG. 2, since the spring 318 tends to maintain the elements 312 and 314 in the relationship shown in FIG. 2. A secondary spring 319 tends to rock the whole assembly in the clockwise direction, so that the follower disk 315 will engage the shutter cam 203.

The sector 312 meshes with a partial pinion 305, as shown in FIG. 2, to rock the square shaft 303 once during each revolution of the cam assembly 200. The connection of the parts is such that when the follower is in its actuated or FIG. 2 position, the shutter assembly 280 is open and this position of the parts corresponds to the projecting position of the slide. At other times, the shutter is closed, so that light will not be projected on the screen when the slide is being ejected and a new slide injected. In other words, the timing of the shutter actuating cam 203 is such that the shutter is closed during practically the whole of the full cycle of operation; it is open only during the interval between successive cycles.

The arrangement described above in connection with FIG. 3 permits the shutter to be partially closed to regulate light intensity, even when the parts are in the FIG. 2 or actuated position, since it permits clockwise movement of the sector 312 beyond the position shown.

The partial closing of the shutter is effected by the manual actuating means referred to above, which includes the shutter control lever 70 which is pivotally mounted on the plate 304 by the pivot rivet 321, shown in FIG. 2. The plate 304 is provided with an arcuate slot 322, and the shutter control lever 70 carries a flanged rivet 323 which extends rearwardly into the slot and engages the edges thereof to provide a frictional engagement. Thus, the lever 70 may be maintained in any desired position, against the bias of the relatively strong spring 318, as will be pointed out.

The shutter control lever 70 is provided with a downwardly projecting lug 324 which engages the sector 312 to rotate the latter in the clockwise direction, as viewed in FIG. 2, and as above described, against the bias of spring 318. Thus, the square shaft 303 may be maintained in a position corresponding to a partial closing of the shutter without in any manner interfering with the rocking motion imparted to the square shaft 303 by the shutter cam 203.

When the shutter is in its closed position, the sector 312 will be to the right of its FIG. 2 position, and clear of the lug 324. Since the square shaft 303 and the rock shaft assembly 310, 312, 314, are biased into the shutter closed position by the spring 319 and since the shutter blades themselves are biased into closed position, the square shaft 303 and the sleeve 296, when the shutter is closed, will always be in the identical angular alignment. Thus, it is possible to remove the lens unit 55 and replace it, providing the shutter is closed, without specially manipulating the respective parts to provide the proper angular alignment. As an example, there may be situations in which it may be desired to substittue the lens unit 55 and this is done by releasing the set screw 207 (FIG. 1) and removing the lens unit 55 from the shell 300.

To summarize the operation, two separate means are provided for operating the shutter, one being the cycling means, and the other being the manually operable lever 70.

The arrangement of the cycling means is such that the shutter is in its open position when the cam assembly 200 is at rest, as determined by the angular position of the cycling cam 192 with respect to the follower 190. This position of the cam assembly and cam 203 is shown in FIG. 2. Therefore, during each cycle of operation the shutter will be first closed and then opened so that the light beam will be cut off during the slide changing operation.

The lever 70 is utilized to regulate the beam intensity, and the construction, which includes a spring biased lost motion connection, is such that the mechanism actuated by the lever 70 will not interfere with the cyclical operation of the cam. Thus, by lowering the lever 70, the lug 324 will displace the sector 312 to the right to cut down the beam intensity.

The dual actuating mechanism is connected to the shutter through the splined connection 303, 296, which permits the shutter to be located in the slidably mounted lens unit 55, in which position the shutter serves as a lens stop to regulate beam intensity.

Although only a preferred embodiment of our invention is shown and described herein, it will be understood that various modifications and changes can be made in the construction shown without departing from the spirit of our invention as pointed out by the appended claims.

We claim:
1. A slide projector comprising a housing, a lens unit slidably mounted in said housing, a shutter device, an operating shaft for said shutter device, mechanism disposed within said housing for operating said projector in successive cycles of operation, said mechanism including a cam assembly, said cam assembly including a shutter cam and a cycling cam, and means for rotating said cam assembly, means providing a mechanical connection between said shutter cam and said operating shaft whereby said shutter device will be operated once during each cycle of operation, means controlled by said cycling cam for terminating the cycle of operation while said shutter is in open position, said shutter device being mounted within said lens unit so that it forms a part thereof and is movable therewith in said housing, said shutter device including a sleeve having a noncircular opening for slidably receiving said operating shaft, said operating shaft having a noncircular cross section which is received within said sleeve so that a driving connection may be provided between said operating shaft and said shutter device without impairing the slidable movement of said lens unit, and additional means movable into engagement with said mechanical connection providing means for operating said shutter from its open position into a partially closed position.

2. A slide projector as claimed in claim 1 in which said additional means is manually operable, and means for maintaining said additional means in an adjusted position whereby said additional means can serve as a manually operable means to regulate the intensity of a light beam passing through said lens unit.

References Cited in the file of this patent
UNITED STATES PATENTS

| | | |
|---|---|---|
| 887,839 | Patterson | May 19, 1908 |
| 1,172,628 | Partington | Feb. 22, 1916 |
| 1,313,241 | Ashley | Aug. 19, 1919 |
| 2,298,322 | Wengel | Oct. 13, 1942 |
| 2,579,281 | Tuck | Dec. 18, 1951 |